United States Patent
Agnihotri et al.

(10) Patent No.: US 11,938,450 B1
(45) Date of Patent: Mar. 26, 2024

(54) MEMBRANE BASED IN-LINE FOULING MONITOR FOR PERFORMANCE TRACKING IN REVERSE OSMOSIS AND NANO-FILTRATION SYSTEMS

(71) Applicants: Dileep Agnihotri, Austin, TX (US); Masoud Aghajani, Boulder, CO (US); Sriram Sambasivam, Schaumberg, IL (US); Joseph John Barelli, Rockford, IL (US); Ian Tonner, Sun Prairie, WI (US)

(72) Inventors: Dileep Agnihotri, Austin, TX (US); Masoud Aghajani, Boulder, CO (US); Sriram Sambasivam, Schaumberg, IL (US); Joseph John Barelli, Rockford, IL (US); Ian Tonner, Sun Prairie, WI (US)

(73) Assignee: Surplus Management, Inc, Loves Park, IL (US)

( * ) Notice: Subject to any disclaimer, the term of this patent is extended or adjusted under 35 U.S.C. 154(b) by 0 days.

(21) Appl. No.: 18/242,922

(22) Filed: Sep. 6, 2023

(51) Int. Cl.
| | |
|---|---|
| *B01D 63/10* | (2006.01) |
| *B01D 61/02* | (2006.01) |
| *B01D 61/10* | (2006.01) |
| *B01D 61/12* | (2006.01) |
| *B01D 65/08* | (2006.01) |
| *B01D 65/10* | (2006.01) |
| *C02F 1/44* | (2023.01) |
| *C02F 103/08* | (2006.01) |

(52) U.S. Cl.
CPC ......... *B01D 65/109* (2022.08); *B01D 61/026* (2022.08); *B01D 61/0271* (2022.08); *B01D 61/10* (2013.01); *B01D 61/12* (2013.01); *B01D 63/10* (2013.01); *B01D 65/08* (2013.01); *C02F 1/441* (2013.01); *C02F 1/442* (2013.01); *B01D 2317/02* (2013.01); *C02F 2103/08* (2013.01); *C02F 2209/02* (2013.01); *C02F 2209/03* (2013.01); *C02F 2209/05* (2013.01); *C02F 2209/40* (2013.01); *C02F 2301/08* (2013.01); *C02F 2303/14* (2013.01); *C02F 2303/22* (2013.01)

(58) Field of Classification Search
CPC ........ B01D 61/10; B01D 61/12; B01D 63/10; B01D 65/109; C02F 2209/05
See application file for complete search history.

(56) References Cited

U.S. PATENT DOCUMENTS

2017/0354929 A1* 12/2017 Byrne ................. B01D 65/104

* cited by examiner

*Primary Examiner* — Bradley R Spies

(57) ABSTRACT

A novel reverse osmosis or nanofiltration system (RO/NF) capable of detecting and responding to onset of fouling within the system utilizing uniquely configured membrane permeate flow path within the system which generates a time-sensitive data. Membrane performance data in real-time operating conditions is then utilized for rapid detection of membrane fouling, fouling rate, and cause of fouling, followed by controller-based system generated actions to stop, and recover from fouling or slow-down fouling, and, if required, to predict, plan, and schedule operator intervention steps to recover optimum system operating conditions. The end-result is a novel energy-efficient and fouling-managed advanced (machine learning) reverse osmosis system for brackish water desalination.

7 Claims, 2 Drawing Sheets

Figure 1:
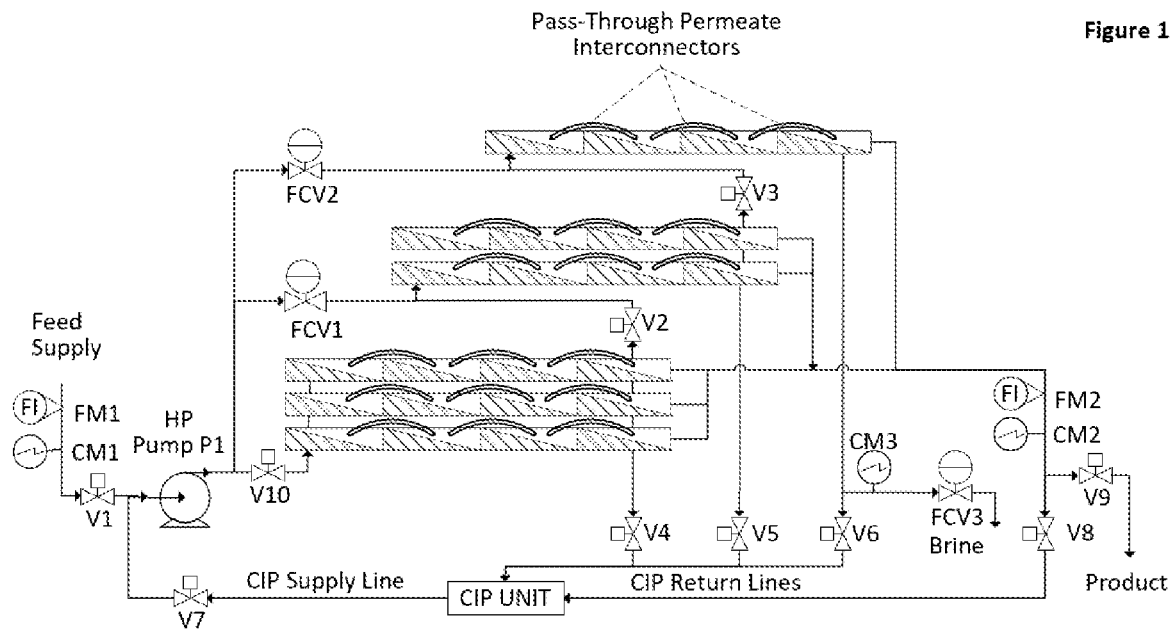

MEMBRANE BASED IN-LINE FOULING MONITOR FOR PERFORMANCE TRACKING IN REVERSE OSMOSIS AND NANO-FILTRATION SYSTEMS

STATEMENT OF FEDERALLY FUNDED RESEARCH

None.

CROSS-REFERENCE TO RELATED APPLICATIONS

None

TECHNICAL FIELD OF THE INVENTION

The invention relates to the field of desalination and primarily focuses on Brackish water (typically as total dissolved solids, TDS, in range of 100-25,000 mg/L) desalination. The concepts disclosed in this application are specific to Reverse Osmosis (RO) and Nano Filtration (NF) systems and related processes utilizing RO and NF membranes inside pressure vessels. The novel concept described in this application allows for in-line monitoring of the membrane fouling in RO and NF systems. With uniquely configured membrane permeate flow path within the system, membrane performance data from real-time operating conditions is utilized for rapid detection of membrane fouling, rate, and cause of fouling, followed by remedial actions to stop, recover or slow-down fouling, and to predict, plan, and schedule operator intervention steps to recover optimum system operating conditions. The end-result is a novel energy-efficient and fouling-managed advanced (smart) reverse osmosis system for brackish water desalination.

BACKGROUND OF THE INVENTION

Without limiting the scope of the invention, its background is related to water purification membranes for removal of total dissolved solids (TDS) using RO/NF membrane technology. The primary treatment of water purification may involve biological or chemical methods such as bio-reactors or clarifiers with coagulation/flocculation processes followed by removal of suspended solids using porous media such as bag-filters, cartridge-filters, multimedia, sand-filters, and micro- or ultra-filtration membranes. The primary treatment processes are not able to remove dissolved solids and impurities and only focus on organics and suspended solids. Additional, secondary treatment processes such as softening, ion-exchange (IX), NF, or RO are implemented for removal of dissolved solids (desalination) such as sodium, chlorides, sulphates, carbonates, silicates, calcium, and magnesium.

NF and RO membranes have proven to be efficient and energy friendly for desalination applications. They are engineered and highly optimized to remove specific material from the influent, for example, total dissolved solids (TDS) in form of mono and di- and tri-valent ions such as $Na^+$, $Cl^-$, $Mg^{2+}$, $Ca^{2+}$, $SO_4^{2-}$, $Al^{3+}$, $N^{3-}$, and other high molecular weight materials such as sugars, chemicals, organic molecules, and other macromolecules. A RO membrane is optimized to reject smallest of the ions such as Na+Cl- ions while an NF membrane is optimized to reject slightly larger and more charged Ca++ and Mg++ ions.

The RO or NF membranes have a polymer matrix with a charged and dense barrier layer (generally polyamide film) where most separation occurs, and the barrier layer allows water to pass through while rejecting the passage of solutes such as salt ions. These membranes can treat water with varying salt concentrations (10 to 40,000 parts per million [ppm]) and can remove 95-99.8% (50-90% in case of NF membranes) of the salts from the feed stream. The process requires that a high pressure be exerted on the feed side of the membrane, usually 50-300 psi (3-20 bar) for low-salinity brackish water (100-10000 ppm TDS), 300-600 psi (20-40 bar) for mid-salinity brackish water (10000-25,000 ppm TDS) and 600-1,000 psi (40-70 bar) for seawater (30,000-45,000 ppm TDS), to overcome the osmotic pressure corresponding to the salt concentration.

During the filtration, the NF/RO membranes allow water to permeate while rejecting dissolved solids, resulting in an increase in concentration of dissolved ions and formation of a concentration polarization (CP) layer near the membrane surface. As concentration polarization develops near the membrane surface, the concentration of foulants, scaling ions such as sulphates, carbonates, silicates, colloidal silica, and biological elements such as bacteria, bio-film, food for bacteria (nitrates), etc. amplifies and often accelerates scaling and fouling of the membrane surface. In addition, the CP layer increases the osmotic pressure resulting in the need for higher net driving force for same permeability. As a result, membranes require additional pressure (electrical energy) to continue target production rate. Subsequently once their flux is reduced by more than 20%, they require chemical clean-in-place (CIP) resulting in down-time along with additional chemical-cost and labor-cost expenses. Overtime, irreversible fouling may occur and require membrane replacement. In addition, each CIP degrades membrane performance due to heating and exposure to aggressive acids and caustic environment. In general, after about 20-25 CIP cycles, a membrane may degrade beyond its useful life. By managing membrane fouling using uniquely configured membrane permeate flow path and its analysis leading to real-time performance measurement of a "membrane element monitor", one can extend duration between CIPs, and reduce irreversible fouling to substantially extend membrane life. In addition, fouling managed operation leads to reduced amount of downtime, chemical and energy consumption (reduced operating pressure) and reduced waste-water to drain (higher recovery), therefore achieving an optimum operating and reduced maintenance cost.

Typical brackish RO/NF treatment systems consume about 1.0-2.5 kwh per 1000 gallons (3800 liters) of treated product water. Membrane fouling in these systems with typical 10-20% flux loss can lead to 20-40% higher energy use. With a real-time detection of fouling, its mechanism using a membrane element monitor and a controller based remedial responses will manage flux decline and realize up to 30% of energy savings over its operational life.

The increased concentration of CP layer and foulants on membrane surface, particularly in the areas of low-mixing and where high concentration causes precipitation of ions and creates a favorable condition for seed sites accelerating scaling and biofouling. To mitigate the issue of CP layer formation near membrane surface, and to reduce membrane adhesion, several strategies are used in current state of art NF/RO systems. These strategies include—a) spacer designs and geometries to promote mixing [Shewei et. al.—1], b) increasing cross-flow velocities with unique spacers [Geraldes et. al.—2], c) membrane with surface modifications—such as hydrophilic, less-charged, smoother to reduce adhesion of foulants [Freeman et. al.—3], d) operating system with limits of critical flux for a given type of water. Critical flux is defined as production rate per unit area of membrane such that flux remains stable over prolonged periods. In addition, to membrane hydraulic design and surface modification, chemicals (antiscalants, oxidants, and biocides) are often injected in feed stream of NF/RO systems—a) to delay precipitation or extend the solubility limits of scale-producing ion-species such as $CaCO_3$, $CaSO_4$, $CaPO_4$, $BaSO_4$, $MgSO_4$, b)—to sequester oxidizing metal species such as Fe, Mn, and Al, c) to breakdown biofilm and reduce bio-fouling.

During membrane fouling, depending on the nature of foulant, in a multi-stage multi-membrane system, a lead-membrane of the first stage may see fouling from particle-loading, biological fouling, or organics fouling more rapidly than any other membrane in the system due to highest flux-rates of the lead-membranes processing >20% more water than the mid-membranes and >50% more water than the tail-membranes. Similarly, a tail-membrane of the last stage typically sees fouling from scale-precipitation and oxidants resulting from continuous concentration of the feed-stream as it passes through the system. The tail-membranes typically do not see significant bio-fouling or particle fouling as their flux is significantly lower than lead-membranes and higher salinity environment is less friendly for biological growth.

Applicant, in another issued US Patent [Agnihotri, et. al.—4], reference incorporated herewith, taught an art to reduce flux distribution differences between lead and tail segments across a multi-stage RO/NF system via mixing feed stream with inter-stage concentrate prior to supplying as feed stream to the subsequent stages. This art also taught how to increase periodic mixing of last stage to agitate and flush precipitated particles in low-velocity zones during operation via supplying additional feed stream to the last stage and temporarily reducing recoveries. Such strategies allow RO/NF system to achieve flatter flux distribution and to spread particle loading and reduce scale-fouling and eventually allow high-recovery operations.

When RO/NF systems begin to foul, either from an unknown system failure or from change in incoming water chemistry or other factors, the membranes begin to lose production (flux) and depending on whether its particle or bio loading or scale, either a lead-element or a tail element will foul first. Since systems operate with a fixed production, once any membrane element fouls with flux loss, the production load is shifted to other membranes. Today, most of the NF/RO systems run at a set production-point (product demand) and automatically compensate for loss of flux from fouling or scaling by increasing the operating pressure. Operators do not know how the system is fouling over time, except for observing that there is an increase in operating pressure. A pressure increase could results from more than one factor—a) reduction in feed water temperature, b) membrane fouling (surface area loss from cake or scale build-up), c) increase in salinity, and d) membrane compaction during high-temperature CIPs. Once the feed pump reaches its pressure limits, the system is no longer able to produce the requested demand of the product. At this point, the operator has no option but to subject the entire system to a CIP process, which could take anywhere from 8-12 hours in duration and may require cleaning steps with low-pH or high-pH chemicals or a combination thereof. Among the four causes for increase in operating pressure, the changes in temperature and salinity can be seen through probes, however, fouling information is not directly visible in current probes. Subject matter experts use temperature and salinity normalized data to track if membranes are suffering from fouling or scaling. However, the normalized flux data is not helpful for multi-stage system as production shifts between stages in a reverse correlation from temperature and pressure losses. As temperature increases, there is higher production from leading stage elements due to increased permeability overall leading to higher concentration salinity in later stages and increased pressure loss leading to significantly reduced production from tail stage elements. These correlation are difficult to normalize and one can only measure and interpret an averaged behavior of the entire system. In most practical implementations, NF/RO system would usually foul or scale and reach a point of non-operable condition without options for pre-emptive interventions. Finally, an offline CIP must be performed, while the system is taken out of service. The CIP cycles are repeated, and membrane rejection performance degrades with repeated CIP, eventually requiring replacement.

In an ideal scenario, if the NF/RO system can detect the onset fouling early on, the system can take remedial steps to stop or slow fouling. These steps may include a) reduction of overall production (average flux of the system), b) reduction of overall recovery (reduced concentration factor), c) improve flux-distribution d) disrupt CP layer more frequently, e) during shut-down-flush, add biocide (in case of biofouling) or low-pH scale dissolving solution, or high-pH organics dissolving solution or specific chemistry of choice targeting specific foulant. However, in typical multi-stage system, one has 12-18 membrane in cascading series [DOW RO Technical Manual—5], fouling and scaling symptoms evolve slowly and on average overall system may lose 10% flux or has 20% increased pressure. Such a small reduction or increase in pressure happens over long periods—worst case 2-3 days and best case 2-3 months. An example of a multi-stage 3:2:1/4 M configuration is shown in FIG. 1 for reference highlighting staged design for brackish water desalination and permeate collection from all membranes within a pressure vessel using common header.

In order to monitor RO and NF systems, prior-arts have focused on standalone ex-situ monitors that are visual [Cohen et. al., Rahardianto et. al. and, Echizen et. al.—6, 7, 8]. These arts are poor representative of in-line membrane behavior in terms of surface velocity, flux, and concentration. They are based on monitor cells with flat-sheet membrane and clear window with a side-conduit to flow liquid. This arrangement results in velocities, pressure-losses and fluxes that do not represent their counterpart in-line spiral wound membrane. These technologies have a narrow range in concentration and velocity to simulate a real membrane surface and changing dynamics of the system that is several orders of magnitude larger. The visual nature of technology is quite expensive to implement and maintain and further requires operators or computer systems trained for image analysis and decision making.

Another method has been used where ex-situ standalone monitor cells have been implemented with chemical tracing methods to track membrane fouling [Kemira Oyj—009]. This approach requires tracking consumables, which makes it more difficult to implement. It again suffers similarly a need for side conduits and is not able to replicate the actual in-line membrane element as its operating inside a pressure vessel. The proposed art teaches a simple, elegant, and cost-effective method without requiring expensive monitor cells, camera, image-analysis, chemical-analysis, etc. and utilizes the performance of in-line membrane (monitors) operating inside the pressure vessels with 100% true operating conditions.

During fouling of an RO system, the lead or tail membranes may lose >70% flux or show significant loss of rejection within short time period (couple hours to couple days, depending on application). The sensitivity of a single lead- or tail-membrane element to track fouling and scaling is directly proportional to loss of its surface area or increased mass-resistance from a sludge film or loss of rejection from oxidation damage. Since the lead or tail element(s) is normally the first to foul, monitoring flux or rejection loss in real-time of this small section of the RO provides early detection of overall system fouling. In contrast, monitoring flux or rejection loss of the entire system is slow to response and highly muted since losses in a fraction of the RO are averaged out across all membranes in a constant production operation. For example, in a 100 gpm RO operating at 15-gfd flux and 24-membrane elements each with 400 ft$^2$ area, a 100 ft$^2$ partial area loss in first or last element would result in 25% of flux loss of this specific element, however, within the entire system, relative loss is only about 1% of the total area would result in only 1% increased pressure. If one monitored the behavior of a pressure vessel instead of entire system, a similar area loss would account for ~6% in a 4-element long pressure vessel while it would be ~4% in a 6-element long pressure vessel. Relative to the entire system, one gains an increased sensitivity of 10-25× when tracking a single element performance (depending on array design and length). Whereas, relative to a single pressure vessel of 4-6 elements, one gains an increased sensitivity of 4-6× when tracking a single element's performance. This first order sensitivity increase comes directly from change in single membrane surface area versus the surface area of all membranes in the system as discussed with a range of 4-25× increase, depending on the number of elements and RO configuration. However, a second order sensitivity increase also arises from relative and strategic position of the monitor membrane element such as lead-element or tail element, wherein additional 1-3× sensitivity increase is achieved. The lead element tends to foul first before others, mostly from particle, bio-load, or organics as these membranes work at 20-40% higher flux relative to rest of the membrane elements. Tail membrane element tends to scale and lose surface area, mostly from precipitation resulting from maximum concentration factor, which other membranes are not subjected to.

This application discloses a system where an in-line direct measurement of lead and tail elements performance from any stage of the RO/NF membrane can be performed without insertion of parallel and external monitoring devices. This method yields higher sensitivity and earlier recognition to the onset of failure in an RO/NF system. Although the innovation disclosed here can be implemented in any stage of the RO/NF system, the most valuable locations are the lead-elements of the first stage and tail elements of the last stage, allowing for detection of onset of fouling and scaling at five to six times shorter time scales for an early detection and sensitivity.

Once a direct membrane performance signal confirms an onset of fouling in the lead-element of RO/NF, one can take mitigation actions. Such responses include alarming operators to verify any failure of pretreatment system such as damaged cartridge filters, take corrective actions to improve pretreatment and bypassing the feed-supply to subsequent stages to reduce over-flux, as described in design by Agnihotri, et. al [4]. Similarly, once a direct membrane performance signal confirms an onset of fouling/scaling or loss of rejection in the tail-element of RO/NF, one can take mitigation actions by reducing the concentration factor and alarming operators to verify presence of oxidizing contaminants (such as free chlorine and metals). In addition, more actions could trigger, such as composition analysis of feed-supply water chemistry, specific scale causing ion-concentration, calculation for saturation indices, adjustment of feed-supply pH value, and planning of future CIP events. These mitigation and remedial actions can be a combination of actions taken by an automated pre-programmed controller using a decision matrix or an algorithm with self-learning correlation matrix for actions and response patterns (i.e., machine learning) or operator assisted changes to operating conditions, leading to a more resilient and a intelligent RO/NF system. The key criteria for such actions to work depends strictly on response time of the system relative to onset of fouling and response-time of the system after mitigation steps are taken, providing a feed-back loop for corrective actions and response to these actions.

References such as Dows Reverse Osmosis Membrane Technical Manual [5] and Veolia presentation by Erickson et. al. [10] can be further consulted to understand how flux through RO membranes can be calculated and its dependence on the feed water chemistry such as ion-concentration (osmotic pressures), temperature, and pressure losses from velocity and permeation.

SUMMARY OF THE INVENTION

The novel concept described in this application allows for real time in-line monitoring of the membrane fouling in RO and NF systems. With uniquely configured membrane permeates flow path within the system, membrane performance data from real-time in-situ operating conditions is utilized for rapid detection of membrane fouling, rate, and cause of fouling. This detection is followed by remedial actions to stop, and recover from fouling or slow-down fouling, and to predict, plan, and schedule operator intervention steps to recover optimum system operating conditions. The end-result is a novel energy-efficient and fouling-managed advanced (machine learning) reverse osmosis system for brackish water desalination.

DESCRIPTION OF THE INVENTION

While the making and using of various embodiments of the present invention are discussed in detail below, it should be appreciated that the present invention provides many applicable inventive concepts that can be embodied in a variety of contexts. The discussed herein are merely illustrative of distinct ways to make and use the invention and do not limit the scope of the invention.

To facilitate the understanding of this invention, several terms are defined below. Terms defined herein have meanings as commonly understood by a person of ordinary skill in the areas relevant to the present invention. Terms such as "a", "an" and "the" are not intended to refer to a singular entity but include the general class of which a specific example may be used for illustration. The terminology herein is used to describe specific embodiments of the invention, but their usage does not delimit the invention, except as outlined in the claims.

Figure 2:
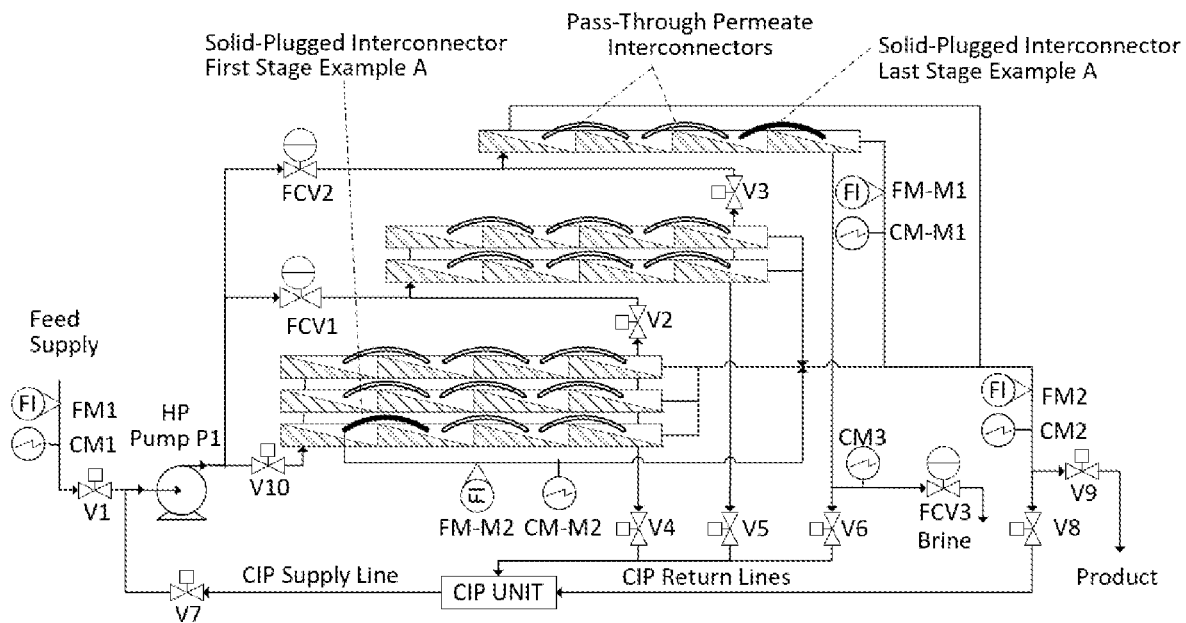
Figure 3:
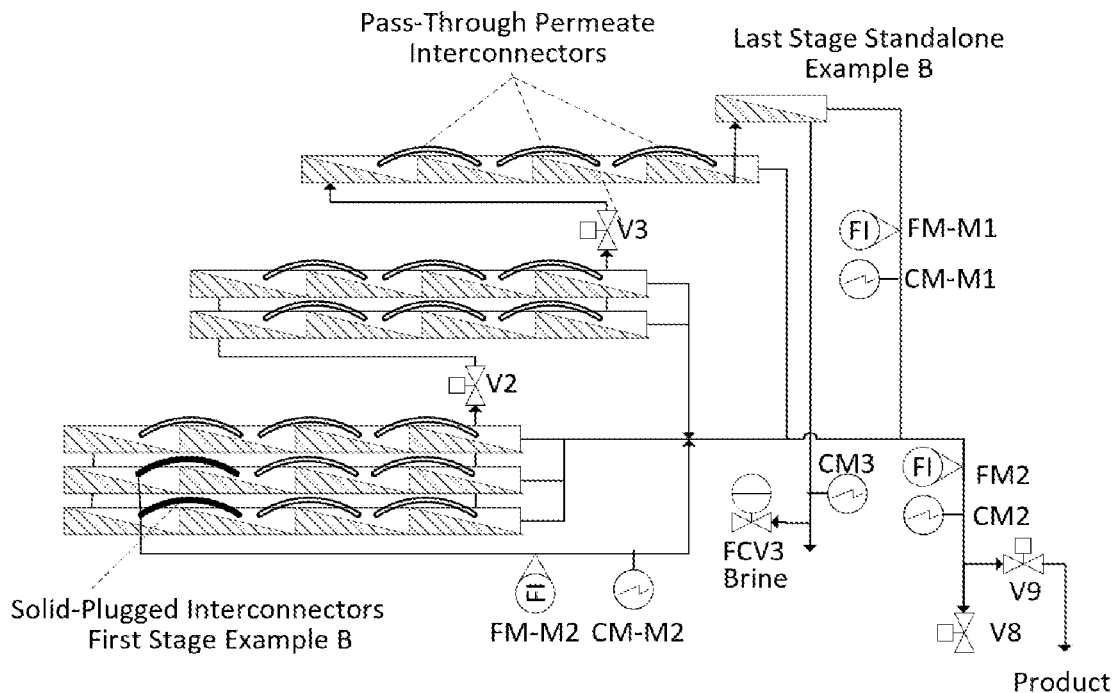
Figure 4:
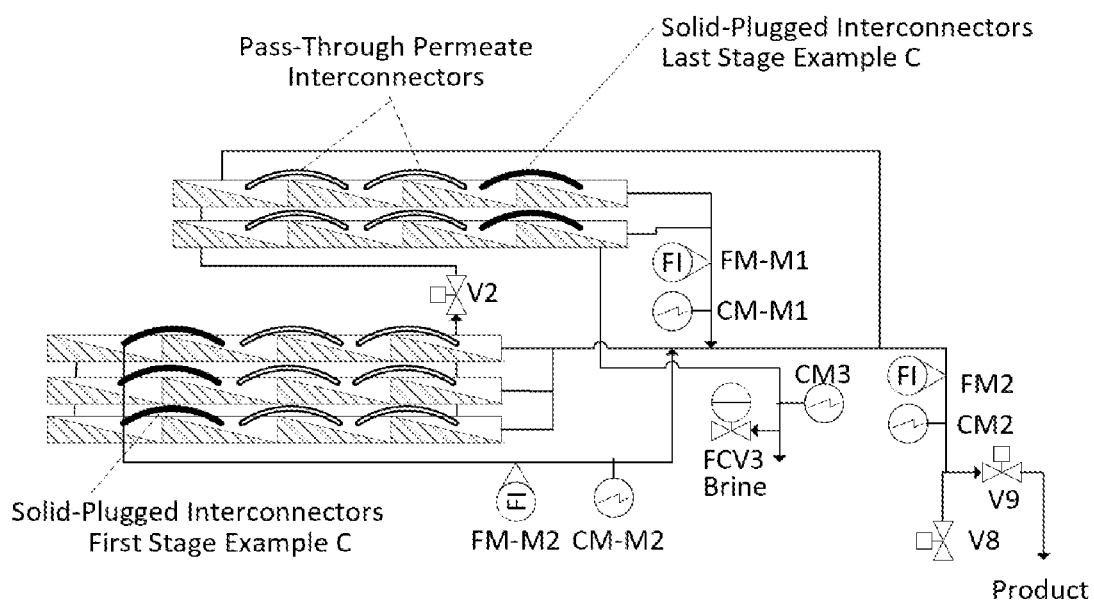

With disclosures of the current art, challenges, and limitations in the Background Section including FIG. 1, this Section provides descriptive details and various embodiments of the invention summarized above and referenced in FIGS. 2, 3, and 4.

In one embodiment of the invention, permeate of the first-membrane element (lead-edge membrane) inside at least one pressure vessel of the first stage is isolated and diverted from that of the rest of the membrane elements inside the pressure vessel using a blanked-off permeate interconnector. The inline permeate of the lead-edge membrane element (referred to hereinafter as "lead-edge monitor") is collected through its end of the pressure vessel while the permeates of all other remaining membrane elements are collected from the opposite end of the pressure vessel using pass-through permeate interconnectors.

In one embodiment of the invention, permeate of the tail-membrane element (tail-edge membrane) inside at least one pressure vessel of the last-stage is isolated and diverted from that of the rest of the membrane elements inside the pressure vessel using a blanked-off permeate interconnector. The inline permeate of the tail-edge membrane element (referred to hereinafter as "tail-edge monitor") is collected through its end of the pressure vessel while the permeates of all other remaining membrane elements are collected from the opposite end of the pressure vessel using pass-through permeate interconnectors.

In one embodiment of the invention, permeate of other lead- or tail-elements inside at least one pressure vessel of any stage of the RO/NF system is isolated and diverted from that of the rest of the membrane elements inside the pressure vessel using a blanked-off permeate interconnector. The inline permeate of this lead- or tail-membrane element (referred to hereinafter as "stage #-lead monitor" or "stage #-tail monitor", respectively and #represent any stage between first and last stage), is isolated and collected through its end of the pressure vessel while the permeates of all other remaining membrane elements are combined and collected from the opposite end of the pressure vessel using pass-through permeate interconnectors.

In one embodiment of the invention, the permeate of the lead-edge monitor, or the tail-edge monitor, or any other stage #-lead monitor or stage #-tail monitor passes through a flow-channel with an inline flow-rate and/or conductivity measurement meters. The performance of a membrane element (lead or tail) of any stage is measured with its productivity (flux) and separation performance (rejection) and is a direct in-line measurement of the system performance in real-time. Any fouling or scaling onset is reflected in real-time trends as loss of flux and loss of rejection behavior at least four times faster than measurement on an entire stage itself, and at least 10 times faster than measurement on an entire system itself.

In one embodiment of the invention, the permeates from one or more of these direct membrane element monitors is added to a common permeate header where permeate from all other non-monitored membrane elements is collected and sent to storage tanks.

In one embodiment of the invention, one or the combination of the measured flux, rejection, and feed and concentrate water sample compositions such as silica or hardness or total organic carbon (TOC), is analyzed by a control program for mitigation and remedial actions. These actions are a combination of an automated pre-programmed rule-based logics or data-driven algorithm with pre-programmed correlation matrices for "action and response pattern", i.e., machine learning, or an operator alarmed and assisted change to the operating conditions, leading to advanced (machine learning) RO/NF systems.

In one embodiment of the invention, various membrane performance monitors, as described in paragraphs [024-028] are collectively referred as "membrane element monitors".

In one embodiment of the invention, as disclosed in paragraphs [016, 017], the permeate quality (rejection) and quantity (flux) measurements are direct membrane performance signals to detect the onset and progression of fouling compared to any other fouling technique used in past, since fouling is driven by the hydrodynamics of the flow inside the feed channel and flux, rate of change of flux are directly related to fouling. Any deviation from typical conditions are detected in the permeation and rejection rates of the membrane, and in our invention is measured directly without requiring any external parallel visual monitors or bulk overall system performance monitors that are too slow or too expensive or difficult to maintain.

In one embodiment of the invention, an additional pressure vessel is included upstream of at least one of the first stage pressure vessels with monitor membrane elements as a possible lead-edge monitor for large-scale systems.

In one embodiment of the invention, all the pressure vessels of the RO/NF system have the same dimension and equally distributed number of elements. For example, in a 3-stage, 4-membrane long system, one could represent system configuration as 3:2:1/4 M with either 4" or 8" membrane elements. In such a system, there is a 12 membrane long series (with total of 24 membranes) and a fouling monitor position could be elements #1 (lead-edge), #5 (stage2-lead-edge) #8(stage2-tail-edge), #9 (stage3-lead-edge) and #12 (tail-edge) in the series. In another example, in a 3-stage, 6-membrane long system, one may represent system configuration as 6:4:2/6 M with either 4" or 8" membrane elements. In such a system, there is an 18 membrane long series (with total of 72 membranes) and a fouling monitor positions could be elements #1 (lead-edge), #7 (stage2-lead-edge) #12 (stage2-tail-edge), #13 (stage3-lead-edge) and #18 (tail-edge) in the series. In one example, membrane element monitor may be individually housed in a single-element pressure vessel before first stage or after last stage. The lead-edge (particle load, TOC, organics, etc.) and tail-edge (scale, solids, and oxidant concentration) are practical for most needs.

As shown in FIG. 2, in one embodiment of the invention, a single membrane element permeate is isolated using a blanked-off permeate tube and diverted from one end of the pressure vessel through a flow-meter and conductivity-meter prior to joining the common header of all permeates. The permeates from all other membranes are collected from the opposing end of the pressure vessel using hollow permeate interconnectors and sent to the common permeate header. One example shows ("First Stage Example A") shows the lead-edge membrane element monitor of the first stage by isolating and diverting first-element permeate in one of the several pressure vessels. Another example shows ("Last Stage Example A") the trail-edge membrane monitor of the last stage by isolating and diverting the last-element permeate from a single pressure vessel.

As shown in FIG. 3, in one embodiment of the invention, we disclose isolation, diversion and measurement of the permeates (quality and quantity) of the first-elements from more than one pressure vessels (shown two pressure vessels) for lead-edge monitor of the first stage.

As further shown in FIG. 3, in one embodiment of the invention, one example of tail-edge membrane element monitor ("Last Stage Example B") is inside a separate pressure vessel downstream of at least one of the pressure vessels of the last stage with at least one membrane element. This arrangement allows measuring the differential pressure across the fouling monitor in addition to the permeate flux and rejection.

As shown in FIG. 4, in one embodiment of the invention, a system with only two stages is designed with an example of multiple membrane lead-edge monitor and tail-edge monitor to further increase sensitivity and accuracy with larger volume measurements. This example shows a monitor ("First Stage Example C") with three (3) first stage lead-elements permeates isolated using blanked-off permeate tube and diverted and combined prior to quality and quantity measurements. A second example shows a monitor ("Last Stage Example C") with two (2) last stage tail-element permeates isolated using blanked-off permeate tube and diverted and combined prior to quality and quantity measurements. Final monitor permeate is merged with the permeate of all other non-monitored membranes in the common header.

In one embodiment of the invention, the fouling monitoring pressure vessel can be isolated from the system to remove the membrane element inside for cleaning or replacement without interrupting the operation and permeate production of the rest of the system.

It is worth noting that the length, diameter, and the number of elements within RO/NF systems can vary in different implementations of the art taught here.

Although, the inventive methods above in paragraphs 19-39 are taught around a 3-stage RO system design, similar functionality is achievable with a single-stage system or a multi-stage system and a monitor can be implemented at the lead-edge, the tail-edge or the interstage lead-edge or tail-edge membrane element. In most applications, the most useful inline direct monitoring location is likely the lead-edge of the first stage or tail-edge of the final stage. In some applications, additional stage specific lead- or tail-edge monitor data may provide additional control points. With a disclosure citing an example of 3-stage implementation, as demonstrated here, a person having ordinary skill in the art (PHOSITA), may be able to implement the concept and inventive steps in any RO/NF system, even if it is a single stage system such as seawater desalination RO application or a 2 or 4 stage system in mid and low salinity levels, respectively.

DESCRIPTION OF THE DRAWINGS AND FIGURE CAPTIONS

A more complete and thorough understanding of the present embodiments and advantages thereof may be acquired by referring to the following description taken in conjunction with the accompanying drawings wherein:

FIG. 1: A example multi-stage (shown as 3-stage 3:2:1) RO or NF Brackish water system with parallel CIP circuits for cleaning of all stages combined. The interstage isolation valves (V2, V3) are open during normal operations and closed during offline CIP cleaning to provide parallel CIP circuits. A single high-pressure pump P1 drives the RO or NF system operation. Meters and valves such as flow-meters [FM 1-2], conductivity-meters [CM 1-3], flow-control valves [FCV 1-3], and valves [V1-V10] provide process control for the system operations. The pressure vessels for all stages show feed channel (shaded) and permeate channel (non-shaded) for multiple spiral wound membrane elements (shown as 4 M configuration with 4-membranes). The membrane permeate channels are coupled through pass-through interconnectors to allow for permeate collection at one or both ends of the pressure vessel.

FIG. 2: Extension of FIG. 1 with a novel process design for in-line membrane performance monitoring using a solid-plugged permeate interconnector for either a lead- or a tail-membrane of any stage to isolate and divert it's permeate through one end of the pressure vessel and then through flow [FM M1-2] and conductivity [CM M1-2] meters. This permeate is subsequently added to the common permeate header. The permeates from all other (non-isolated) membranes are collected from the opposite end of the pressure vessel using pass-through interconnectors and sent to the common permeate header. Combined final permeate is measured in quality and quantity using FM2 and CM2 flow and conductivity sensors. The "First Stage Example A" shows the lead-edge membrane element monitor for the first stage by isolating and diverting first-membrane permeate in one of the many pressure vessels. Similarly, the "Last Stage Example A" shows the tail-edge membrane element monitor for the last stage by isolating and diverting the last-membrane permeate from a single pressure vessel in a 3:2:1/4 M system configuration. In this example, middle stage is not monitored.

FIG. 3: A multi-stage (3:2:1/4 M configuration) RO or NF process flow with a monitor "First Stage Example B" showing isolation and diversion of the permeate of the first-membranes from more than one pressure vessels (shown as 2) is combined for lead-edge membrane monitoring of the first stage. This Figure also shows a "Last Stage Example B" where a standalone single-element pressure vessel is added as additional stage to collect and monitor a tail-edge membrane performance using a single element permeate prior to combining it in the common permeate header.

FIG. 4: This figure shows an example of a two-stage (3:2/4 M configuration) RO or NF process flow with a "First Stage Example C" showing isolation and diversion of the permeate of the first-membranes from all three pressure vessels combined and subsequently used for lead-edge membrane element monitoring of the first stage. In addition, shown a "Last Stage Example C" where the tail-edge membrane element monitoring of the last stage is done by isolating and diverting the combined last-membrane permeate from both pressure vessels.

REFERENCES

1. Ma Shenwei, Concentration Polarization in Spacer Filled Reverse Osmosis Membrane Systems—PhD Thesis Submitted at National University of Singapore, 2005
2. Geraldes V., Semiao V., Pinho, M. N. (2002)—Hydrodynamics and concentration polarization in NF/RO spiral-wound modules with ladder type spacers, Desalination, 157, 395-402.
3. U.S. Pat. No. 8,017,050B2 Freeman et. al. Water purification membranes with improved fouling resistance
4. U.S. Ser. No. 10/864,481B1 Agnihotri et. al. US Patent—Energy efficient low-fouling high-recovery RO system for brackish water desalination.
5. https://www.filterwater.com/docs/filmtec/dow-filmtec-ro-membranes-technical-manual-609416.pdf—Dow Reverse Osmosis Membrane Technical Manual (Section 3).
6. U.S. Pat. No. 7,910,004B2 Cohen et. al. US Patent—Method and system for monitoring reverse osmosis membranes.
7. WO2019209239A1 Rahardianto et. al. PCT Application—Method and apparatus for real-time direct membrane surface monitoring.
8. U.S. Pat. No. 8,404,119B2 Echizen et. al. US Patent—Method of membrane separation and membrane separation apparatus.
9. US20220185706A1 Kemira Oyj, US Patent Application—Monitoring of membrane fouling 10. Peter K Eriksson—The International Desalination Association World Congress on Desalination and Water Reuse 2015/San Diego, CA, USA

The invention claimed is:

1. A desalination system with spiral-wound membrane elements housed in pressure vessels comprising:
   a main feed-stream for treatment, a main permeate-stream where permeates from the entire system is collected for use, and a final concentrate-stream;
   one or more stages with each stage having one or more pressure vessel(s) and a common feed inlet-header, a common concentrate outlet-header, and one or more permeate outlet-header(s) that eventually combine to form the main permeate-stream;
   wherein the inlet stream for first stage comprises of main feed-stream and inlet stream for subsequent stages comprises of either preceding stage-concentrate stream or a blend of preceding stage-concentrate stream and a portion of the main feed-stream;
   wherein each pressure vessel has one or more spiral wound membrane element(s) and a central permeate channel with hollow interconnectors to collect and transfer membrane permeates through one or both ends of the pressure vessel to form the main permeate-stream;
   wherein within any stage, one or more pressure vessel(s) have blanked-off interconnectors to isolate and divert permeate of either the lead or the tail membrane element from the remaining membrane elements within the pressure vessel to allow for specific membrane element permeate quality and quantity measurements;
   wherein the diverted permeate(s) of the isolated one or more membrane element(s) within a stage for either lead or tail membrane element(s) is collected through their own ends of the pressure vessels and combined as "diverted-permeate" and the permeates of all other membrane elements are collected through the opposite end of the isolated membrane elements;
   wherein the quality and quantity of the said "diverted-permeate" flows through one or more measurement apparatus for temperature, pressure, conductivity, composition, flow-rate, pH, or oxidation potential for real-time diverted-permeate data for inline monitoring and diverted-permeate subsequently merges with the main permeate-stream;
   wherein the diverted-permeate data, termed as "membrane element monitor" is used for real-time membrane performance measurements of either lead or tail ends of a stage within the system;
   wherein the membrane element monitor data is tracked and analyzed for quality, quantity, rates-of-change, limits, look-up-tables, and correlations to feed-water compositions to rapidly detect membrane fouling and perform either automated or operator assisted actions resulting in—a) slowing-down fouling, b) stopping fouling, c) recovering from fouling, d) predicting, planning, and scheduling steps for system recovery and improved system performance.

2. The desalination system of claim 1, wherein at least one lead-edge membrane element monitor is included in the first stage to track and analyze fouling from particles and organics load due to over-fluxing of the lead membrane elements.

3. The desalination system of claim 1, wherein at least one tail-edge membrane element monitor is included in the last stage to track and analyze fouling from scaling and concentrated oxidants damage on membranes.

4. The desalination system of claim 1, wherein a membrane element monitor is implemented in a separate stand-alone pressure vessels, akin to a single membrane stage, to gain additional measurement of trans-membrane pressures across the membrane element monitor which is not accessible when implementation is inside common pressure vessels.

5. The desalination system of claim 1, wherein "membrane element monitor" and other measurement apparatus for temperature, pressure, conductivity, flow-rate, composition, pH, or oxidation potential are used concurrently to build correlation matrices for actions and response-patterns for an improved overall system operation.

6. The desalination system of claim 1, wherein spiral-wound membranes are either reverse osmosis membranes or nanofiltration membranes.

7. The desalination system of claim 1, wherein an existing system has been retrofitted with one or more "membrane element monitors" and programmed to predict and control fouling to improve overall system performance.

* * * * *